US010751927B2

(12) United States Patent
Derrien (10) Patent No.: US 10,751,927 B2
(45) Date of Patent: Aug. 25, 2020

(54) METHOD FOR CONTROLLING A PROCESS FOR THE BLOW-MOLDING OF PLASTIC CONTAINERS

(71) Applicant: SIDEL PARTICIPATIONS, Octeville-sur-mer (FR)

(72) Inventor: Mikael Derrien, Octeville-sur-mer (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 386 days.

(21) Appl. No.: 15/329,114

(22) PCT Filed: Jul. 17, 2015

(86) PCT No.: PCT/FR2015/051976
§ 371 (c)(1),
(2) Date: Jan. 25, 2017

(87) PCT Pub. No.: WO2016/012706
PCT Pub. Date: Jan. 28, 2016

(65) Prior Publication Data
US 2017/0203495 A1    Jul. 20, 2017

(51) Int. Cl.
*B29C 49/78* (2006.01)
*B29C 49/06* (2006.01)
(Continued)

(52) U.S. Cl.
CPC .............. *B29C 49/78* (2013.01); *B29C 49/06* (2013.01); *B29C 49/12* (2013.01); *B29C 49/36* (2013.01);
(Continued)

(58) Field of Classification Search
None
See application file for complete search history.

(56) References Cited

U.S. PATENT DOCUMENTS 5,169,705 A * 12/1992 Coxhead ................. B29C 49/12
425/150
2010/0176528 A1  7/2010 Monin et al.
(Continued)

FOREIGN PATENT DOCUMENTS

| EP | 2 460 638 A2 | 6/2012 |
| JP | H6-254955 A | 9/1994 |
| WO | 2008/081107 A2 | 7/2008 |

OTHER PUBLICATIONS

International Search Report, dated Oct. 27, 2015, from corresponding PCT Application.

*Primary Examiner* — Monica A Huson (57) ABSTRACT

Method for controlling a method for the manufacture of a container by stretch-blow-molding of a plastic preform (2) in a machine (1) including a mold (26), the preform (2) having a body (3), a neck (4) opening at one end of the body (3) and a bottom (5) closing the body (3) at another end thereof, the manufacturing method including the operations involving:—heating the preform to a predetermined temperature in a thermal conditioning oven (10);—introducing the preform (2) into the mold (26);—moving a stretching pin (28) so as to stretch the preform (2); this control method involving a step that consists in determining the position of impact (P0r) of the stretch pin (28), namely the position it occupies at the moment at which it reaches the bottom (5) of the preform (2) during its movement.

21 Claims, 2 Drawing Sheets

(51) Int. Cl.
*B29C 49/12* (2006.01)
*B29C 49/36* (2006.01)
*B29C 49/42* (2006.01)
*B29C 49/64* (2006.01)
*G05B 19/18* (2006.01)
B29L 31/00 (2006.01)
B29K 67/00 (2006.01)
B29K 23/00 (2006.01)
B29K 105/00 (2006.01)

(52) U.S. Cl.
CPC ...... *B29C 49/4289* (2013.01); *B29C 49/6418* (2013.01); *G05B 19/18* (2013.01); B29C 2949/78033 (2013.01); B29C 2949/78369 (2013.01); B29C 2949/78722 (2013.01); B29K 2023/065 (2013.01); B29K 2067/003 (2013.01); B29K 2105/258 (2013.01); B29L 2031/7158 (2013.01); G05B 2219/45244 (2013.01); Y02P 70/271 (2015.11)

(56) References Cited

U.S. PATENT DOCUMENTS

| | | |
|---|---|---|
| 2012/0139169 A1 | 6/2012 | Finger |
| 2014/0079839 A1 | 3/2014 | Finger |
| 2014/0145378 A1 | 5/2014 | Deau et al. |

\* cited by examiner

FIG.2

METHOD FOR CONTROLLING A PROCESS FOR THE BLOW-MOLDING OF PLASTIC CONTAINERS

BACKGROUND OF THE INVENTION

Field of the Invention

The invention relates to the manufacture of containers, such as bottles or jars, obtained by stretch blow molding of preforms made of thermoplastic material, such as polyethylene terephthalate (PET), high-density polyethylene (HDPE), or any other known material.

The invention relates more particularly to a method for manufacturing containers made of plastic material, such as PET, by stretch blow molding of preforms, in a mold, with a pressurized fluid, particularly air, of the type in which the machine for its implementation comprises a control system, a thermal conditioning oven, and a blow-molding unit comprising at least one blow-molding station, said station having a mold, into which the preforms are introduced, coming from the oven, each one to undergo an operation of transforming into a container, the operation including a stretching stage (also called an elongating stage) of the preform, using an elongating rod that is associated with the mold and is controlled in sliding toward the bottom of the mold.

Description of the Related Art

The stretching and the blow molding of the body of a preform require that it be brought to a temperature that is higher than the glass transition temperature of the material. Thus, first of all, a thermal conditioning of the preform is initiated by making it circulate inside an oven. The oven comprises heating means that are, for example, formed from infrared lamps. The preform is moved into the oven by a conveying system.

Then, the heated preform is introduced into the mold, and then it is stretched by means of a sliding rod (called stretching or elongating rod), and pressurized gas is introduced into the preform to transform it into a container by blow molding. The introduction of the pressurized gas in all cases comprises a blow-molding stage itself, which consists in introducing into the preform a gas, generally air under high pressure (typically between 18 and 40 bars). The blow-molding stage ordinarily is preceded by a first stage, called pre-blow molding, which consists in introducing a gas having a lower pressure (between 8 and 15 bars) while the elongating rod, having reached the bottom of the preform, causes its longitudinal stretching. The stretching, pre-blow-molding and blow-molding (alternatively stretching and blow-molding) stages occur according to a pre-established sequence during the parameterizing of the machine, a sequence that takes into account the preforms used and the shape of the container to be obtained. The stretching and the blow molding (or the pre-blow molding and the blow molding) make it possible for the material that makes up the preform to undergo a molecular double orientation, which imparts to the final container particular mechanical properties. The pre-blow molding starts the deformation of the preform to transform it into a container, and the blow molding makes possible an optimal taking of the impression in the mold, so that the details of the container are well marked.

In the following description, unless other details are introduced, the expression "blow-molding process" will be used equally to designate a sequence comprising a pre-blow-molding stage followed by a blow-molding stage or to designate a process that comprises only a blow-molding stage. Consequently, "to begin the blow-molding process" will signify either to start the pre-blow-molding stage by injecting the pre-blow-molding gas in the case where such a stage exists, or to start the blow-molding stage directly by injecting the blow-molding gas.

After a certain time of contact of the plastic material against the mold, during a degassing stage, the pressure in the container is brought back to the atmospheric pressure before removing the final container from the mold. In other methods, the degassing stage is preceded by a stage for recycling a portion of the fluid contained in the container, so as to reinject it toward other uses (in the machine itself or in the factory where the machine is installed). There can also be a stage known as flushing for the bottles that are hot-fillable, during which a circulation of air ensures the cooling of the container that is in contact with a hot mold.

The preforms are generally obtained by injection of the material into dedicated injection molds. They have a tubular cylindrical body that is closed at one of its axial ends, which is extended at its other end by a neck, it also being tubular. The neck of the preform is generally injected in such a way as to already have the shape of the neck of the final container, while the body of the preform is called on to undergo a relatively significant deformation to form the body of the final container, following the blow-molding operations. The necks of the preforms often have bearing collars intended to hold them on the upper edge of the molds, during the formation of the containers.

A container has a side wall (also termed body), a neck that extends from an upper end of the body, and a bottom that extends from a lower end of the body, opposite the neck. The bottom of the container defines a seat, generally at the junction with the body, and by which the container can rest on a flat surface (such as a table).

The mold comprises a wall defining a cavity intended to impart its shape to the body of the container. This cavity is closed, at a lower end, by a mold bottom intended to impart its shape to the bottom of the container.

Today, to parameterize a machine to produce a given type of container, there is placed in a mold of the machine, while it is stopped, a preform emerging from injection (therefore cool and not having undergone reheating) corresponding to those that will be used for this type of container, and then the position of the elongating rod when it reaches the bottom of the preform is determined. The position at which the end of the elongating rod reaches the bottom of the preform is conventionally called by the applicant point zero ("Point 0") of the elongation. From Point 0, the continuation of the movement of the elongating rod causes the elongation of the preform. During the parameterizing, a position of the elongating rod is also established at which the blow-molding process must begin, which can correspond to Point 0 or be located beyond this point. In other words, a theoretical stretching length between Point 0 and the beginning of the blow-molding process is determined. Actually, as soon as the preform begins to be stretched, if nothing else is done, the material making up the preform is tightened on the rod. A first consequence is a risk of excessive cooling of the zones of the preform in contact with the elongating rod (the elongating rod is generally cool) leading to a container of very poor quality, because it then becomes impossible to deform these zones well because of their cooling. Another consequence is a risk of damage, particularly by piercing, of the bottom of the preform by the elongating rod.

Other operations are also parameterized between the time when the elongating rod reaches the bottom of the preform and the time when the bottom of the preform, driven by the rod, reaches the bottom of the mold (called Point 10). Other operations still take place after reaching Point 10.

This way of doing things has various drawbacks.

Actually, the determination of Point 0 is made with the machine stopped, on a cool preform that has emerged from the injection press. Now, it has been found that apparently identical preforms could have a different behavior after their passage into the thermal conditioning oven of the blow-molding machines.

In particular, it has been found that after heating in the oven, the length of some preforms could vary, the difference being able to reach 5 to 10 mm from one preform to the next. In particular, it has been found that for preforms of slight thickness, used to produce small-sized bottles, for example bottles of 0.5 liter, and with slight wall thicknesses, the length of such preforms at the oven outlet could be more than 10 mm shorter in relation to their length at the entrance to the oven, in other words in relation to their length at the outlet of the injection press. In the case of preforms intended to be transformed into small-sized bottles (typically lightweight water bottles of 0.5 liter), such a reduction in length, also called retraction or "shrinkage" by a person skilled in the art, corresponds to a longitudinal variation of about 15%. This reduction is also accompanied by an increase in the diameter of the preform. For the same type of bottles, increases in diameter of about 7% have been noted. On the other hand, for the same production of preforms, differences of several mm between the maximum retraction and the minimum retraction can also exist.

The existence of a retraction during the heating of the preforms results in the generating of stresses in the preforms during their manufacture. These stresses appear because of the pressures or else of the temperature to which the material is subjected during the injection. During the heating, a portion of the stresses is relaxed with, as a consequence, a reduction in the length and an increase in the diameter of the preforms. The relaxing of the stresses is sometimes called "relaxation."

Differences in retraction have been noted not only for the same production of preforms or on preforms of the same type, but even from one type of preform to the next. These phenomena are made worse by the current tendency to reduce the weight of the containers and therefore that of the preforms and of their thickness.

For the same type of preforms, the various retraction phenomena and the differences can be explained in the following way: when the preforms are obtained using the same press that can contain several tens of cavities (presses with one hundred cavities are known), it can happen that, from one cavity to the next, there is not exactly the same quantity of material that is injected, or else that one cavity is less well cooled than the next. Furthermore, a single machine for manufacturing containers must be supplied with several hundreds of thousands of preforms (some going beyond one million) per day of production, and it is conceivable that the preforms intended for such a machine do not exit from the same injection press. In this case, variations from one press to the next can occur, because of possible differences of adjustment of the parameters between two presses. Finally, other parameters can have an influence, such as the intrinsic quality of the injected material.

The retraction differences from one type of preform to the next can have one or more origins, among which in particular are the different parameters of the designs of the preforms, the thicknesses of the preforms, the specifications of the resins and/or the parameters of the injection processes, particularly the injection pressure, even though the weights of the preforms would be identical.

As a consequence, the containers produced will be able to have different distributions of material, given that some preforms will not have undergone retraction, while others will have undergone it that, moreover, will be able to be different from one preform to the next.

Furthermore, inasmuch as some preforms will have become shorter than others before their introduction into the mold, the actual stretching will begin before reaching Point 0 determined during the parameterizing. Now, the stretched length of the preform before the beginning of pre-blow molding has considerable influence on the distribution of the material of the container (for certain containers, the stretching must be zero). Also, if the stretching begins too early in relation to the pre-blow molding, or if a stretching takes place when it should not have, and if the retractions are different from one preform to the next, different distributions of material will appear on the containers, with a risk of tightening of the material on the rod, a risk that is all the higher as the containers are manufactured with a high rate of elongation.

The current machines are increasingly automated, which makes it possible to correct various time-based drifts of the blow-molding method. It is known (see the document WO2008/081107 in the name of the applicant) to correlate unique points of an actual curve of blow molding with machine parameters (particularly the flow rate or the pressure of pre-blow molding), and to apply corrections of the parameters as a function of divergences found at these unique points. However, automation does not make it possible to correct defects such as those mentioned above. Actually, a drift or drifts caused by the modification of the physical characteristics of a preform cannot be corrected by the adjustment method described in the previously-cited document WO2008/081107.

BRIEF SUMMARY OF THE INVENTION

A first object is to eliminate these drawbacks, by proposing a method that makes it possible to improve the forming of the containers produced, while limiting waste, and while maintaining—even increasing—the rates of production.

Another object is a method that can, as appropriate, be used in an automated machine such as the one mentioned in the previously-cited document WO2008/081107.

"Forming," in the following description, means more particularly a distribution of the material.

For these purposes, according to a first aspect, a method is proposed for controlling a process for manufacturing a container by stretch blow molding of a preform made of plastic material in a machine having a mold, the preform comprising a body, a neck that opens at one end of the body, and a bottom closing the body at another end of the body, the manufacturing method comprising the operations consisting in:

heating the preform to a predetermined temperature in a thermal conditioning oven;

introducing the preform into the mold;

moving an elongating rod so as to stretch the preform;

the control method comprising a stage consisting in determining the impact position of the elongating rod, i.e., its position at the moment it reaches the bottom of the preform during its movement.

Thus, by determining the impact position, in other words the actual Point 0 (impact point of the elongating rod) and no longer a theoretical Point 0, it becomes possible to optimize the manufacture of the containers, by taking into account the behavior of the preforms during their reheating. Furthermore, determining the actual Point 0 makes it possible to deduce from it the longitudinal retraction undergone by the preform, which consists of the difference between the impact position as determined and the position that it would have reached in the absence of retraction.

The control method has, according to various uses, the following characteristics, where appropriate combined:

the determination of the impact position of the elongating rod is made by detecting an increase in the drive torque of the elongating rod;

since the driving of the elongating rod is done using an electric motor, the determination of the impact position of the elongating rod is made by detecting the moment when the current driving the electric motor increases, reflecting the resistance to the driving undergone by the elongating rod because of its contact with the bottom of the preform;

the difference between the impact position and a benchmark impact position of the elongating rod, predetermined during the parameterizing of the machine, is calculated, an order to begin the blow-molding process being given only if the calculated difference does not exceed a predetermined allowable value;

the order to begin the blow-molding process is given when the elongating rod reaches its impact position;

the order to begin the blow-molding process is given after the elongating rod has reached its impact position and has caused a beginning of stretching of the preform;

the difference between the impact position and the benchmark impact position of the elongating rod, predetermined during the parameterizing of the machine, is calculated, a defect signal being transmitted when the difference reaches or exceeds a predetermined allowable value;

the difference between the impact position and the benchmark impact position of the elongating rod is calculated, the preform being ejected after the reopening of the mold when the value of the difference exceeds a predetermined allowable value;

the difference between the impact position and the benchmark impact position of the elongating rod is calculated, is verified if the difference is recurring, and, if yes, at least one parameter of the machine is modified;

the benchmark impact position of the elongating rod is the theoretical impact position that would be obtained with a cool preform leaving the injection machine;

the benchmark impact position of the elongating rod is an average real impact position calculated during the parameterizing of the machine from a sample of several preforms having undergone a reheating and, as a consequence, a retraction, under conditions that will be used during production.

Secondly, a machine for manufacturing containers from preforms is proposed that comprises at least one mold in which an elongating rod can be driven in sliding, the drive means of the elongating rod being associated with means for detecting the impact position of the elongating rod when it comes into contact with the bottom of the preform.

BRIEF DESCRIPTION OF THE DRAWINGS

Other objects and advantages of the invention will come to light from the description provided below with reference to the accompanying drawings in which.

DETAILED DESCRIPTION OF THE PREFERRED EMBODIMENTS

In the following description, the terms "raised," "low," and the derivative terms "upper," "lower," are used for the sake of clarity with reference to the orientation of the figures without which this would not have any limiting scope.

Figure 1:
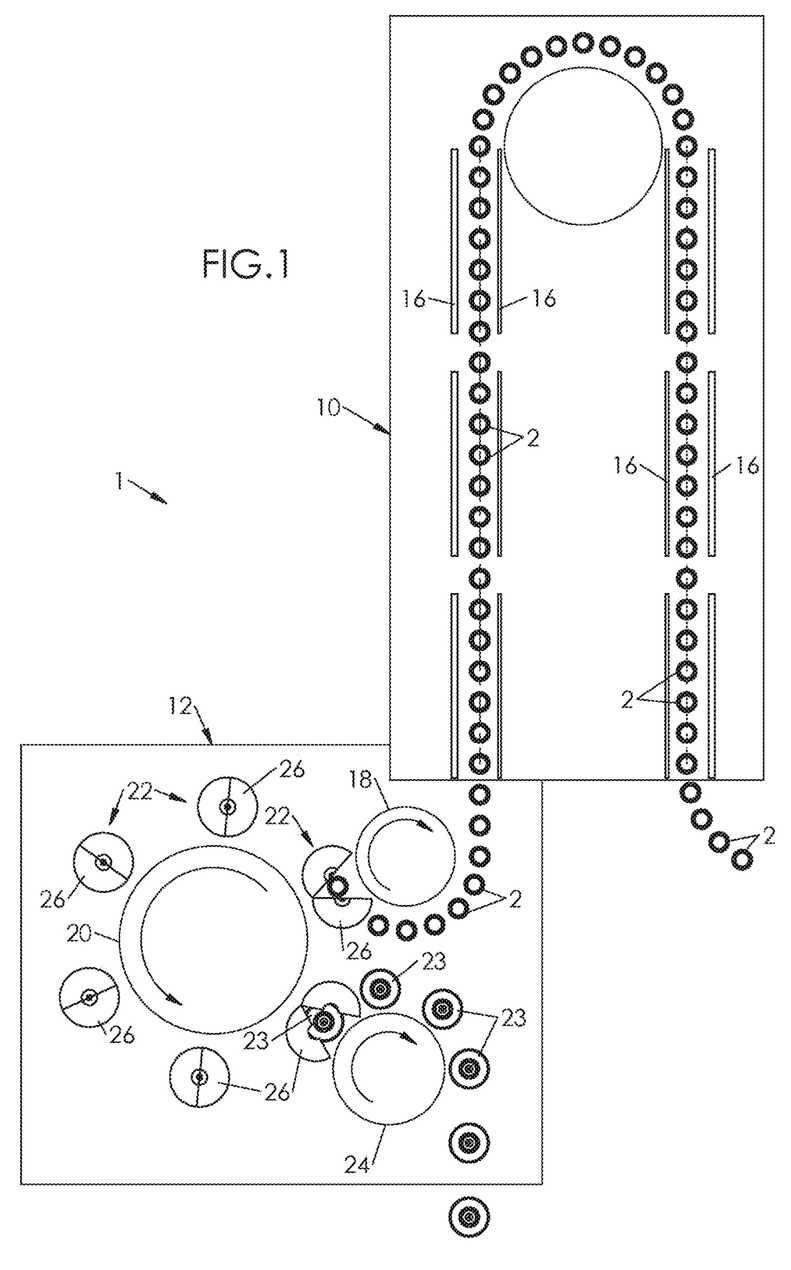
FIG. 1 is a diagrammatic view of a machine for manufacturing containers.

In FIG. 1, a machine 1 for manufacturing containers from preforms 2 made of thermoplastic material and more particularly made of PET (polyethylene terephthalate) is illustrated diagrammatically.

Each preform 2 has a cylindrical body 3, a neck 4 having the final shape of that of the container to be obtained (which generally does not undergo the least deformation during the manufacture of the container) and which opens at one end of the body 3, and a bottom 5 whose shape is generally hemispheric and which closes the body 3 at its other end.

The manufacturing machine 1 comprises an oven 10 and a blow-molding unit 12.

The oven 10 has the function of heating the preforms 2 to a temperature greater than or equal to the glass transition of the constituent material, for example greater than 80° C. when this material is PET.

The oven 10 comprises a conveyor (illustrated diagrammatically) to transport the preforms 2 by having them rotate on themselves, and heating means 16, such as infrared lamps facing reflectors or laser sources, to heat the preforms 2.

The preforms 2 enter into the oven 10, mounted on the conveyor that makes a U-shaped path. They are heated in a stream by the heating means 16, which, where appropriate, are placed on one side or on both sides of the preforms 2 in relation to their direction of advance.

The hot preforms 2 are removed from the oven 10 and transferred into molds of the blow-molding unit 12 by a first transfer device 18, such as a transfer wheel, inserted between the oven 10 and the blow-molding unit 12. The transfer wheel comprises arms (not shown, because they are known in the art) that successively grasp the preforms 2, after their exit from the oven 10, in the area of their neck, to introduce each in turn into a mold 26 of the blow-molding unit 12.

The blow-molding unit 12 comprises a rotating carousel 20 at the periphery of which several blow-molding stations 22 are mounted.

Each blow-molding station 22 comprises at least one mold 26 that is usually composed of three parts, namely two half-molds 26A, 26B and a mold bottom 26C, which define the cavity for manufacturing the container.

Each hot preform 2 leaving the oven 10 is introduced into a mold 26 of the blow-molding station 22 to be blow molded there and transformed into a container 23. Once completed, the container 23 is removed from the blow-molding station 22 by a second transfer device 24, similar to the first transfer device 18, and well known to a person skilled in the art.

Figure 2:
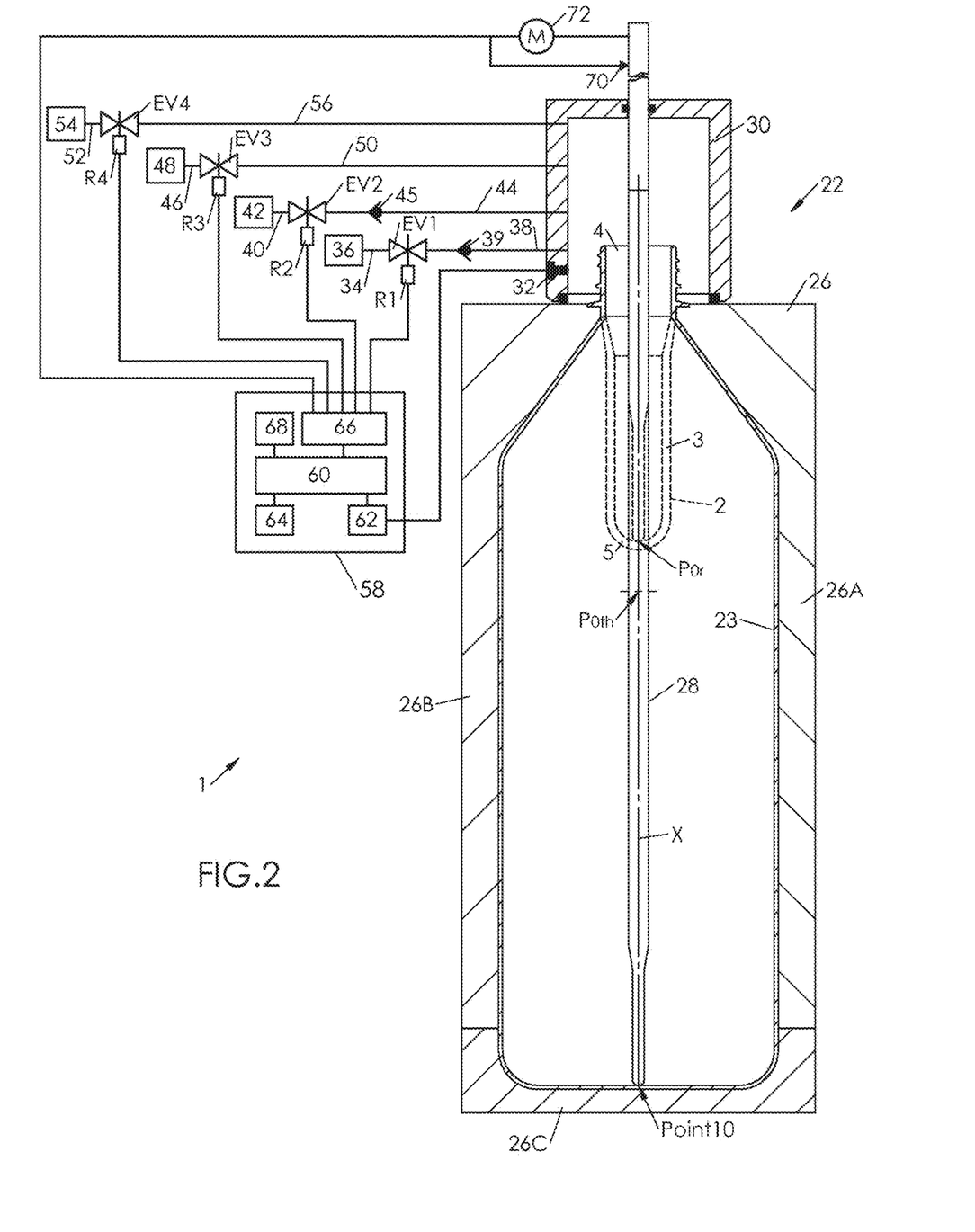
FIG. 2 is a cutaway diagrammatic view of a blow-molding station within the machine of FIG. 1.

In FIG. 2, a blow-molding station 22 is presented in detail. It comprises:

a mold 26, made of steel or aluminum alloy, consisting of two half-molds 26A, 26B and a mold bottom 26C, defining a cavity whose periphery has the shape of the final container 23 produced. The mold 26 is intended to receive, successively, hot preforms 2 that come from the oven 10, an elongating rod 28 mounted to move along the main axis X of the mold 26, between a raised position making possible the introduction of a preform 2 into the mold 26 when the mold is open and a low position where the end of the elongating rod 28 is in contact with the mold bottom 26C. Passing from the raised position to the low position of the elongating rod 28 is performed to stretch the material axially along the axis X, a blow-molding nozzle 30, mounted to move between a raised position during the introduction of the preform 2 and a low position where the lower end of this nozzle 30 caps the preform 2 in an airtight manner so as to bring the blow-molding air into the preform 2 to press the plastic material against the walls of the mold 26. The elongating rod 28 slides into the nozzle 30, a pressure sensor 32, which opens into the nozzle 30 to make a measurement there of the pressure prevailing in the closed space made by the nozzle 30 and the preform 2 during the blow-molding operation of the container 23, an air circuit 34 for pre-blow molding at a low pressure of between 3 and 15 bars. This circuit 34 comprises a low-pressure source 36 and a pipe 38 making it possible to route the air from the low-pressure source 36 to the nozzle 30 to form the future container 23 and a solenoid valve EV1, called a pre-blow-molding solenoid valve, making possible communication between the low-pressure source 36 and the interior of the preform 2, through the nozzle 30. The solenoid valve EV1 is placed on the pipe 38 between the low-pressure source 36 and the nozzle 30. The pre-blow-molding air circuit 34 also has a non-return valve 39 that prevents the fluid coming from another source or that is contained in the preform (or the container) from being introduced there, a high-pressure, between 15 and 40 bars, blow-molding air circuit 40 that comprises a high-pressure source 42 and a pipe 44 making it possible to route the fluid from the high-pressure source 42 to the nozzle 30 to form the future container and a solenoid valve EV2, called a blow-molding solenoid valve, controlling the communication between the high-pressure source 42 and the preform 2. The solenoid valve EV2 is placed on the pipe 44 between the high-pressure source 42 and the nozzle 30. The blow-molding air circuit 40 also has a non-return valve 45 that prevents the fluid coming from another source or contained in the preform (or the container) from being introduced there, a circuit 46 for recovery of the blow-molding air, which comprises a pipe 50 that makes it possible to route the air contained in the container after its manufacture toward recovery means 48, such as a circuit or a recovery tank, and a solenoid valve EV3, called a recovery solenoid valve, controlling the communication between the container and the recovery means. The solenoid valve EV3 is placed on the pipe 50 of the recovery circuit 46, a degassing circuit 52 making it possible to put the interior of the container into communication with the exterior, for the resetting to atmospheric pressure, before the rise of the nozzle 30 into the raised position, the degassing circuit 52 comprising a loop for venting, one end of which is connected to a sound suppressor 54 so as to prevent any noise disturbance, and the other to a pipe 56 connected to the nozzle 30, and a solenoid valve EV4, called a degassing solenoid valve, controlling the communication of the air contained in the container 23 with the atmosphere, an electronic control unit 58, particularly in the form of a programmable logic controller (PLC), connected electrically to the pressure sensor 32, with the solenoid valves EV1, EV2, EV3, EV4 by way of the respective actuators R1, R2, R3, R4 whose function is to ensure the opening and/or closing of the solenoid valves EV1, EV2, EV3, EV4.

Advantageously, the control unit 58 comprises:

a processor 60, an analog input module 62 connected to the pressure sensor 32 to collect the measurements from it and to convert them into a digital signal for their processing by the processor, a memory 64 connected to the processor for storing data coming from the pressure sensor 32 (after conversion), an analog output module 66 controlled by the processor 60, and controlling the solenoid valves EV1, EV2, EV3, EV4 by way of the actuators R1, R2, R3, R4 so as to regulate the opening and closing to cause the flow rate of fluid supplied to the nozzle 30 to vary, and the device for controlling axial movement of the elongating rod 28, a communication interface 68 for the implementation, in the control unit 58, of the program regulating its operation, a sensor 70 for detecting the torque applied by drive means 72 of the elongating rod 28, connected to the analog output module 66 for a processing by the processor 60. In one embodiment, the drive means 72 consist of an electric motor, and the sensor 70 for detecting the torque is a current sensor.

The analog output module 66 also receives the positional data of the elongating rod 28 coming from the electric motor.

The operation of the machine is similar to that of the known machines, except that the machine uses a method according to which the movement of the elongating rod 28 is controlled, so as to determine the impact position (P$0r$) of the elongating rod 28 at the moment it reaches the bottom 5 of the preform 2 during its movement and to give the order for the beginning of the blow-molding process while taking into account this actual position.

In FIG. 2, where the preform 2 is illustrated in dashes, the impact position (P$0r$) of the elongating rod 28 is indicated while the stretching has not yet begun. Assuming that the preform 2 has undergone a retraction during its heating in the oven 10 by the heating means 16, the theoretical Point 0 (P$0th$) used in the previous methods would be slightly farther in the travel of the elongating rod 28, as is illustrated in FIG. 2.

The determination of the impact position (P$0r$) of the elongating rod 28 can be made by detecting the drive torque of the rod, thanks to the sensor 70 that can be a current sensor. The arrival of the elongating rod 28 in contact with the bottom of the preform 2 is reflected by an increase in the torque necessary for driving it, creating a call for more considerable current at the motor 72.

The position of the elongating rod 28 at this moment can easily be measured using means within the scope of a person skilled in the art, for example means to measure the number of revolutions made by the motor 72 from its departure from its initial position and to send the corresponding data to the analog output module 66.

The measurement of the position of the elongating rod 28 is continuous so that, after the impact position (P$0r$) has been reached, the processor 60 is able to give an order to begin the blow-molding process (order to begin the pre-blow-molding stage or order to begin directly the blow-molding stage) at a time that has been determined during the parameterizing of the machine 1.

In one implementation, the machine 1 is parameterized so that the order for beginning the blow-molding process is given at the very moment when the elongating rod 28 enters into contact with the bottom 5 of the preform 2. In other words, the stretching begins in synchronism with the blow-molding process. In a variant, the machine 1 is parameterized so that the order for beginning the blow-molding process is given after the elongating rod 28 has reached its impact position (P0$r$) and has caused a beginning of stretching, of several millimeters, of the preform 2.

In fact, in practical terms, it is the actual length of stretching that is checked so as to give the order for beginning the blow-molding process at the appropriate time.

In a preferred implementation, during the parameterizing, a benchmark impact position (Pe) of the elongating rod 28 is determined.

In a variant of this implementation, the benchmark position (Pe) corresponds to the theoretical impact position or Point 0 (P0$th$) that would be obtained by placing into the mold 26 preforms that have not undergone heating in the oven 10.

In a second variant of this implementation, the benchmark impact position (Pe) is determined using measurements made from several preforms 2 corresponding to those that will be used in production. The preforms of the sample are subjected to a heating in the oven 10 that is identical to the one that they will undergo in production, the impact position (P0$r$) of each is measured, which makes it possible to estimate an average impact position (in other words, an average retraction), which constitutes the benchmark position (Pe). Of course, the number of preforms of the sample must be significant so that the benchmark impact position (Pe) is correct.

Regardless of the type of preform used to determine the benchmark position, it can be entered manually into the control unit by an operator or acquired automatically during its determination.

For each type of preform, an allowable difference value between the benchmark impact position (Pe) and the impact position (P0$r$) is entered into the control unit 58. The value of the allowable difference is a value beyond which it becomes difficult or impossible to envisage a correct forming of the container, because the automatic adjustment of the blow-molding stages becomes challenging.

In production, the value of the difference between the impact position (P0$r$) of each preform and the benchmark impact position (Pe) is calculated and, if, for a preform, it exceeds that of the allowable difference, then in one implementation, a defect signal is transmitted thanks to the control unit 58. In a variant or in addition, the preform (or the poorly-formed container) being considered can be ejected when the mold is reopened at the end of a cycle.

The appearance of a defect signal can be used to start additional investigations. Thus, a recurring spike of allowable difference may occur after the loading of a new lot of preforms, whose quality of the injection would have varied in relation to the qualified preforms. Also, in one implementation, it is verified whether the difference is recurring and if yes, an attempt is made to modify automatically at least one parameter of the machine to obtain a heating profile making possible a retraction that is compatible with the obtaining of a correct forming of the container.

The concept, therefore, is that the invention can be used in different ways.

A first way consists in performing a simple quality control of the preforms 2, the determination of the impact position (P0$r$) not being systematic but made only on a single one or certain of the blow-molding stations 22 every wheel rotation, so as to verify by correlating preform temperature and preform length that the preforms introduced into the machine have a stable quality. Actually, if, after identical heating of preforms 2 having the same characteristics of radiation absorption and the same material, a variation in length is noted, this means variations in the injection qualities of the lots of preforms 2 that are sequentially loaded.

The result of the measurements will be able to be compared to, for example, a length of heated preform, deemed to conform and automatically or manually acquired during the parameterizing of the process (with a range that is more or less defined by the user). In the case of recurring spikes, signifying retractions outside of the defined specifications, the user will be able to be merely informed or the production stopped.

A second way consists in making, in addition to performing the quality control of the preforms in conformance with the first way, an additional adjustment of the beginning of the blow-molding process: in this case, an acquisition is made for each blow-molding station 22, on each wheel rotation. The quality control portion cited previously can be incorporated and, in addition, the beginning of the blow-molding process (generally the beginning of the pre-blow-molding stage, insofar as it is required) after the beginning of the stretching (beyond the actual Point 0, which corresponds to most of the cases) can be adjusted as a function of the length of the preform after heating and retraction, to begin automatically after the preform 2 has been stretched from a predetermined length during the parameterizing. This makes it possible to control thoroughly this essential parameter that is the length of preform 2 stretched before the beginning of the blow-molding process to ensure a good material distribution of the containers.

The invention is particularly suitable for the lighter preforms having slight thickness for which the rates or orientation are high and therefore the heating applied is high.

Actually, the slight thicknesses of preforms, on the order of 1.5 mm, which are increasingly encountered, are particularly conducive to the presence of numerous stresses during the injection. During the heating of the preform, the rates of double orientation of the material are high, and the heating applied in the oven 10 must be at a high temperature (125° C.-135° C.). The association of this high temperature with the stresses present in the preforms will have the effect of generating a retraction of the preforms over their length and a slight expansion on their diameter.

The significant retraction relates essentially to the preforms of slight thickness intended to make bottles for still water of small volume (typically less than 0.5 liter). The lengths of these preforms are less than 90 mm (typically between 60 and 70 mm). The retraction after heating on this type of preform can easily reach 10 mm, which corresponds to nearly 15% retraction on a preform of 70 mm for a diameter expansion of about 7%. The same preform with the same resin, but with a reduced stress level, will have, after heating, a retraction of about 5 mm (or about 7% retraction and 3% diameter expansion).

The additional regulation of the beginning of the blow-molding process can be associated with any type of machine, including so-called intelligent machines, i.e., which furthermore have other regulation systems (systems for control of containers by sight, or others), such as those described in the previously-cited document WO2008/081107. It can be envisaged for any type of preforms and of bottles because even if the most significant retractions are more observed on the preforms of slight thickness intended to make bottles for still water of small volume, they are present on all of the preforms.

The invention claimed is:

1. A t method for controlling a process for manufacturing a container by stretch blow molding a preform made of plastic material in a machine including at least one mold, the preform having a body, a neck that opens at one end of the body, and a bottom that closes the body at another end of the body, the manufacturing method comprising:
    heating the preform to a predetermined temperature in a thermal conditioning oven;
    introducing the preform into the mold;
    moving an elongating rod to stretch the preform; and
    determining an impact position of the elongating rod which is a position of the elongating rod at the moment the elongating rod reaches the bottom of the preform during movement thereof,
    wherein the determining is made by detecting an increase in a drive torque of the elongating rod.

2. The method according to claim 1, wherein the difference between the impact position and a benchmark impact position of the elongating rod, predetermined during parameterizing of the machine, is calculated, and
    an order to begin the blow-molding process being given only when the calculated difference does not exceed a predetermined allowable value.

3. The method according to claim 1, wherein the order to begin the blow-molding process is given when the elongating rod reaches the impact position.

4. The method according to claim 1, wherein the order to begin the blow-molding, process is given after the elongating rod has reached the impact position and has caused a beginning of stretching of the preform.

5. The method according to claim 1, wherein the difference between the impact position and a benchmark impact position of the elongating rod, predetermined during parameterizing of the machine, is calculated, and
    a defect signal being transmitted when the difference reaches or exceeds a predetermined allowable value.

6. The method according to claim 1, wherein the difference between the impact position and a benchmark impact position of the elongating rod is calculated, the preform being ejected after reopening of the mold when the value of the difference exceeds a predetermined allowable value.

7. The method according to claim 1, wherein the difference between the impact position and benchmark impact position of the elongating rod is calculated, is verified when the difference is recurring, and, if yes, at least one parameter of the machine is modified.

8. The method according to claim 2, wherein the benchmark impact position of the elongating rod is a theoretical impact position that would be obtained with a cool preform leaving the injection machine.

9. The method according to claim 2, wherein, the benchmark impact position of the elongating rod is an average real impact position calculated during parameterizing of the machine from a sample of several preforms having undergone a reheating and, as a consequence a retraction, under conditions that will be used during production.

10. A machine configured to implement the method according to claim 1 for the manufacture of containers from preforms, the machine comprising:
    the at least one mold in which the elongating rod is driven to slide,
    wherein driving of the elongating rod occurs using an electric motor, which is associated with a sensor configured to detect the impact position of the elongating rod when the elongating rod comes into contact with the bottom of a preform.

11. The method according to claim 2, wherein the order to begin the blow-molding process is given after the elongating rod has reached the impact position and has caused a beginning of stretching of the preform.

12. A method for controlling a process for manufacturing a container by stretch blow molding of a preform made of plastic material in a machine including at, least one mold, the preform having a body, a neck that opens at one end of the body, and a bottom that closes the body at another end of the body, the manufacturing method comprising:
    heating the preform to a predetermined temperature in a thermal conditioning oven;
    introducing the preform into the mold;
    moving an elongating rod to stretch the preform using an electric motor; and
    determining an impact position of the elongating rod which is a position of the elongating rod at the moment the elongating rod reaches the bottom of the preform during movement thereof,
    wherein the determining is made is detecting the moment when the current driving the electric motor increases, reflecting the resistance to the driving undergone by the elongating rod because of a contact of the elongating rod with the bottom of the preform.

13. The method according to claim 1, wherein the difference between the impact position and a benchmark impact position of the elongating rod, predetermined during parameterizing of the machine, is calculated, and an order to begin the blow-molding process being given only when the calculated difference does not exceed a predetermined allowable value.

14. The method according to claim 12, wherein the difference between the impact position and a benchmark impact position of the elongating rod, predetermined during parameterizing of the machine, is calculated, and
    an order to begin the blow-molding process being given only when the calculated difference does not exceed a predetermined allowable value.

15. The method according to claim 12, wherein the order to begin the blow-molding process is given when the elongating rod reaches the impact position.

16. The method according to claim 2, wherein the order to begin the blow-molding process is given when the elongating rod reaches the impact position.

17. The method according to claim 12, wherein the order to begin the blow-molding process is given after the elongating rod has reached the impact position and has caused a beginning of stretching of the preform.

18. The method according to claim 12, wherein the difference between the impact position and a benchmark impact position of the elongating rod, predetermined during parameterizing of the machine, is calculated, and
    an order to begin the blow-molding process being given only when the calculated difference does not exceed a predetermined allowable value.

19. The method to claim 12, Wherein: the Order to begin the blow-molding process is given when the elongating rod reaches the impact position.

20. The method according to claim 12, wherein the difference between the impact position and a benchmark impact position of the elongating rod, predetermined during parameterizing of the machine, is calculated, and a defect signal being transmitted when the, difference reaches or exceeds a predetermined allowable value.

21. The method according to claim 12, wherein the difference between the impact position and a benchmark impact position of the elongating rod is calculated, the preform being ejected after reopening of the mold when the value of the difference exceeds a predetermined allowable value.

* * * * *